United States Patent Office 2,995,605
Patented Aug. 8, 1961

2,995,605
NEW AND USEFUL MALIC ACID DIAMIDE-COMPOUNDS AND PROCESS FOR THEIR MANUFACTURE
Adolf Emil Siegrist, Basel, and Franz Ackermann, Binningen, Switzerland, assignors to Ciba Limited, Basel, Switzerland
No Drawing. Filed Oct. 13, 1959, Ser. No. 846,049
Claims priority, application Switzerland June 17, 1955
7 Claims. (Cl. 260—562)

This is a continuation in part of our copending application Serial No. 591,302, filed June 14, 1956, now abandoned.

The present invention provides new and valuable acylamino compounds, for example the compound of the formula (1) 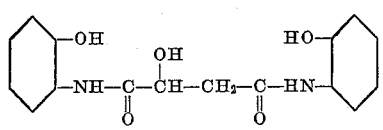

which corresponds to the general formula (2) 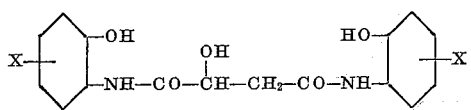

in which X represents a hydrogen atom, a chlorine atom, a lower alkyl group, a lower alkoxy group or a phenyl group.

The invention also provides a process for the manufacture of the new and valuable compounds of the Formula 2, wherein one molecular proportion of malic acid is condensed with two molecular proportions of a primary aryl amine that contains a hydroxyl group in adjacent position to the amino group and that corresponds to the general formula (3) 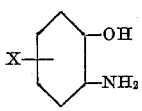

in which X represents a hydrogen atom, a chlorine atom, a lower alkyl or alkoxy group, such as ethyl, methyl, tertiary-butyl, methoxy or ethoxy groups, or a phenyl group. The lower alkyl and lower alkoxy groups have preferably not more than four carbon atoms.

As examples of primary aryl amines of the Formula 3 the following compounds may be mentioned:

1-amino-2-hydroxy-5-methylbenzene,
1-amino-2-hydroxy-4-methylbenzene,
1-amino-2-hydroxy-5-tertiary-butylbenzene,
1-amino-2-hydroxy-5-methoxybenzene,
1-amino-2-hydroxy-5-chlorbenzene, and
1-amino-2-hydroxy-5-phenylbenzene.

For the condensation, the malic acid can be used as such, so that as a rule it is not necessary to use it in the form of a suitable functional derivative, for example in the form of an acid halide, for reaction with the aryl amines of the Formula 3. The condensation is advantageously carried out in the presence of an inert organic solvent. For this purpose a variety of solvents can be used in which both starting materials are stable. With advantage solvents having relatively high boiling points, for example a boiling point above 100° C. are used. Good results are obtained, for example, with solvents of the benzene series boiling above 100° C., such as toluene, xylenes, cumene, chlorobenzene, di- or tri chlorobenzene or nitrobenzene. In order not to render the conversion time too protracted, it is to be recommended to work at temperatures above 100° C., but it is advisable in general not to exceed 200° C.

When the conversion is complete, the acylamino-compounds of the Formula 2 can be isolated from the reaction mixture in the customary manner known per se. In some cases they are so difficultly soluble in the solvent used that they are deposited, perhaps after cooling of the mixture, in very good yield and purity.

The new acylamino compounds of the Formula 2 are valuable intermediate products for the manufacture of optical brightening agents. They can be converted, for example with the aid of agents that split off water into α:β-di-[aryloxazolyl-(2)]-ethylene compounds, which in this manner are produced considerably more easily and in purer form than according to the known method by heating of o-hydroxy amino aryl compounds with succinic acid and subsequent dehydrogenation (cf. U.S. Patent No. 2,483,392 to Meyer et al.).

The following examples illustrate the invention the parts being by weight:

*Example 1*

109 parts of 1-amino-2-hydroxybenzene and 67 parts of malic acid are stirred with 550 parts of chlorobenzene with the exclusion of air for about 8 hours while gently boiling, whereby the water produced is continuously distilled off together with some chlorobenzene. The whole is then allowed to cool and the resulting condensation product filtered off and washed with chlorobenzene, alcohol and water. For the removal of unreacted starting materials, the filter residue is treated with dilute hydrochloric acid, filtered, washed with water until the filtrate reacts neutral and dried. The resulting product of the formula (1) 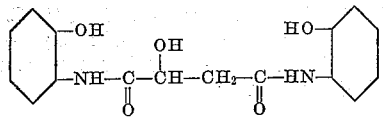

which can be obtained pure by reprecipitation from dilute sodium hydroxide solution, forms a light colored powder soluble in alcohol or dioxane, of melting point 165° C.

By replacing the 109 parts of 1-amino-2-hydroxybenzene by the equivalent quantity of 1-amino-2-hydroxy-5-chlorobenzene, the compound is obtained of the formula

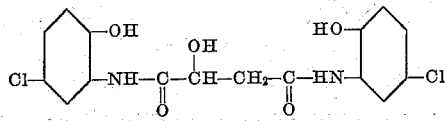

which possesses similar properties.

From the resulting acyl compounds, optical brightening agents can be prepared as follows:

To a melt of 10 parts of water and 150 parts of zinc chloride are added at 160–170° C. 30 parts of the condensation product obtained according to the first paragraph of this example, and the mixture is then maintained for 10–18 hours at the specified temperature. Then 600 parts of cold water are added dropwise while allowing the temperature to fall. After the addition of hydrochloric acid to produce an acid reaction, the whole is stirred for 1 hour at 80–100° C. and the resulting product filtered, washed with water, dried and crystallized from dioxane. The known α:β-di-[benzoxazolyl-(2)]-ethylene of the formula

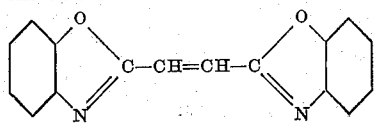

is obtained as a crystalline powder which after recrystallization from dioxane melts at 242–243° C.

By replacing the 30 parts of the compound obtained according to the first paragraph of this example by that obtained by condensation of 1-amino-2-hydroxy-5-chlorobenzene and malic acid, α:β-di-[(5)-chloro-benzoxazolyl-(2)]-ethylene is obtained which possesses similar properties and when recrystallized from dioxane melts at 262–263° C.

Example 2

369 parts of 1-amino-2-hydroxy-5-methylbenzene, 208 parts of malic acid and 2000 parts of chlorobenzene are stirred with the exclusion of air for 8 hours while gently boiling, the water produced being distilled off. The reaction mixture is then allowed to cool and the resulting condensation product filtered off, washed with alcohol and benzene and dried.

The compound is obtained of the formula

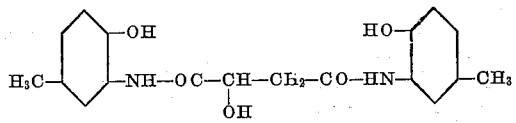

as a light colored crystalline powder of melting point 230° C. It dissolves in dilute sodium hydroxide solution and is reprecipitated with hydrochloric acid.

From the resulting acyl compound with the aid of zinc chloride by the method described in Example 1 α:β-di-[5-methylbenzoxazolyl-(2)]-ethylene of the formula

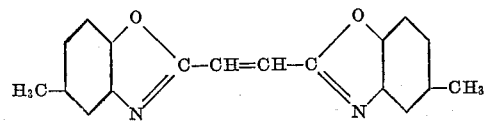

can be produced which when recrystallized from methylene chloride-alcohol melts at 183–184° C.

By using instead of 1-amino-2-hydroxy-5-methylbenzene, 1-amino-2-hydroxy-4-methylbenzene the compound is obtained of the formula

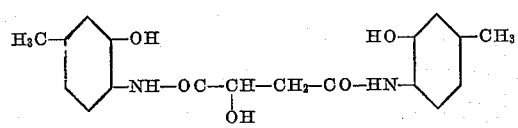

from which by means of zinc chloride the α:β-di[6-methyl-benzoxazolyl-(2)]-ethylene of the formula

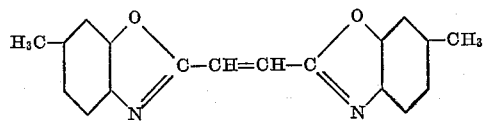

is obtainable, which when recrystallized from methylene chloride-ethanol melts at 190–191° C.

Example 3

16.5 parts of 1-amino-2-hydroxy-5-tertiary butyl-benzene and 6.7 parts of malic acid are stirred under reflux for 6 hours with 100 parts of xylene with the exclusion of air, the water produced being isolated in a water separator. The whole is then cooled to room temperature and the condensation product of the formula

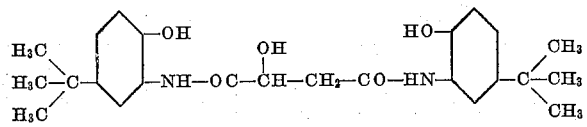

filtered off, washed with xylene and dried. The colorless crystals are soluble in dioxane and alcohol and have a melting point of 215–216° C.

From this acyl compound, an optical brightening agent can be prepared as follows:

6.5 parts of the acyl compound are introduced into a melt at 160–170° C. of 2 parts of water and 35 parts of zinc chloride and the whole is stirred for 3 hours at this temperature. Then while allowing the temperature to fall, 60 parts of water are introduced dropwise and the whole is stirred at 90–100° C. until a homogeneous solution is produced. This is then rendered acid to Congo red with concentrated hydrochloric acid, stirred for a further ½ hour at 50° C., filtered while still warm and the residue washed with water at 50° C. and dried. The reaction product of the formula

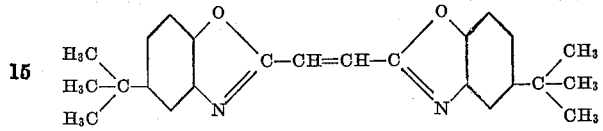

after recrystallization from dioxane-water, yields yellow needles of M.P. 153–154° C.

Example 4

5.5 parts of 1-amino-2-hydroxy-5-phenylbenzene and 2.1 parts of malic acid are stirred under reflux for 90 minutes with 50 parts of xylene, the water produced being continuously distilled off. The whole is then cooled to room temperature (about 20° C.) and the condensation product of the formula

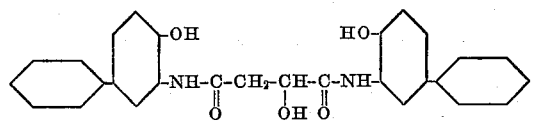

filtered off, washed with xylene and dried. The colorless crystals are soluble in dioxane and alcohol and have a melting point of 256–257° C.

What is claimed is:

1. Malic acid diamide compound of the formula

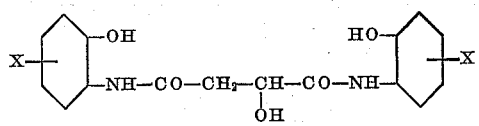

in which X is a member selected from the group consisting of hydrogen, chloro, lower alkyl, lower alkoxy and phenyl.

2. The malic acid diamide compound of the formula

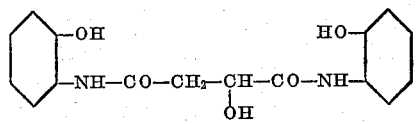

3. The malic acid diamide compound of the formula

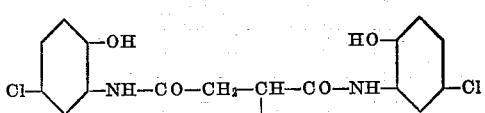

4. The malic acid diamide compound of the formula

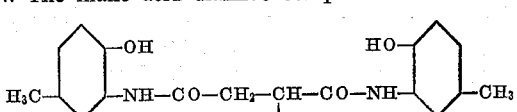

5. The malic acid diamide compound of the formula

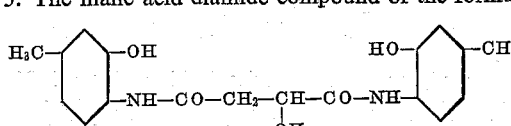

6. The malic acid diamide compound of the formula

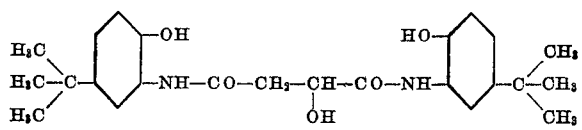

7. The malic acid diamide compound of the formula

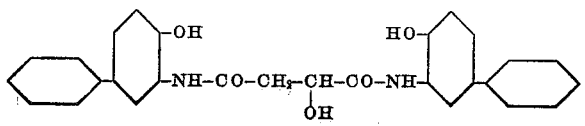

References Cited in the file of this patent

Hubner: "Annalen der Chemie," vol. 210, p. 384–386 (1881).
Wirths: "Archiver der Pharmacie," vol. 234, pp. 620–634.
Medinger: "Journal Prakt. Chem.," vol. 86 (2), pp. 345–349.
Beilstein's Handbuch der Organischen Chemie (4th ed.), vol. 13, p. 495 (1930).
Wright: "Chemical Reviews," vol. 48, pp. 408–411 (1951).
Hein et al.: "Journal American Chemical Society," vol. 79, pp. 427–429 (1957).
Theilacker: "Journal Prakt. Chem.," vol. 153, pp. 54–56 (1939).